United States Patent [19]

Ruyle

[11] Patent Number: 4,830,585
[45] Date of Patent: May 16, 1989

[54] PUMPING SYSTEM

[76] Inventor: Phillip L. Ruyle, Rte. #1, Box 141 A, Medora, Ill. 62063

[21] Appl. No.: 79,083

[22] Filed: Jul. 29, 1987

[51] Int. Cl.⁴ ............................................. F04B 23/04
[52] U.S. Cl. .................... 417/360; 417/362; 417/423.5; 417/423.15; 417/900; 415/66; 415/72
[58] Field of Search .............. 417/360, 362, 423 E, 417/423 L, 423 T, 423 G, 424 R, 900, 205; 415/60, 61, 66, 72, 197; 418/178

[56] References Cited

U.S. PATENT DOCUMENTS

| | | | |
|---|---|---|---|
| 300,384 | 6/1884 | Mathieu | 415/60 |
| 1,412,285 | 4/1922 | James | |
| 2,556,391 | 6/1951 | Hawk | 415/72 X |
| 2,936,107 | 6/1988 | Blackburn | 417/205 |
| 3,318,438 | 5/1967 | Neebel et al. | |
| 3,417,929 | 12/1968 | Secrest | |
| 3,482,767 | 12/1969 | Reinkoester | 417/423 L X |
| 3,693,842 | 9/1972 | Cozzarin et al. | 415/72 X |
| 3,879,150 | 4/1975 | Brown et al. | 415/72 |
| 4,019,830 | 4/1977 | Reid | 415/72 |
| 4,318,670 | 3/1982 | Fechter et al. | 415/72 |
| 4,531,892 | 7/1985 | Nasmann et al. | |
| 4,594,006 | 6/1986 | Depeault | |
| 4,661,046 | 4/1987 | Ruyle | |

Primary Examiner—Carlton R. Croyle
Assistant Examiner—Eugene L. Szczecina, Jr.
Attorney, Agent, or Firm—Fleit, Jacobson, Cohn & Price

[57] ABSTRACT

This invention pertains to a system for pumping a fluid of a variable consistency into a fluid container. The system includes a vacuum power assist auger to withdraw fluid upwardly from a reservoir. A hose connecting an outlet end of the power assist auger to a fluid inlet at one end of a booster pump assembly is provided to supply fluid to the fluid inlet. A fluid outlet is provided at another end of the booster pump assembly. The fluid outlet is connected to a loading pipe so that the fluid is forced by the booster pump assembly through the fluid outlet and the loading pipe to the fluid container. A vacuum is created by the booster pump assembly in the hose so that fluid of a variable consistency may be withdrawn easily from the reservoir by the power assist auger and the booster pump assembly.

7 Claims, 2 Drawing Sheets

PUMPING SYSTEM

BACKGROUND OF THE INVENTION

This invention relates to a system which is used to displace a fluid which varies greatly in consistency. The invention is particularly useful in loading manure into a manure wagon.

Difficulty arises in attempting to load manure from a pit in which it is contained into a manure wagon used to transport the manure due to a tendency of the solids within the manure to settle toward the bottom of the pit. Most of the more liquid portion of the manure is displaced toward the top of the pit as the solids settle toward the bottom of the pit, causing the manure to vary greatly in consistency and rendering it difficult to pump or otherwise remove the manure from the pit.

A pump type vacuum device used in combination with a vacuum power assist auger has been found to effectively withdraw manure from the pit in which it is contained. The vacuum power assist auger described may be identical to that described in my prior U.S. Pat. No. 4,661,046. The vacuum device withdraws the liquid portion of the manure from the pit easily, while the vacuum power assist auger helps to withdraw the more solid, settled portion of the manure. However, it has been found that the settled solids at the bottom of the pit, which are withdrawn by the auger, tend to clog some types of vacuum devices, that are used for top loading which in turn may cause the vacuum power assist auger to overload. Accordingly, a pump type vacuum device which is least likely to clog when used in conjunction with a vacuum power assist auger is needed.

U.S. Pat. No. 4,531,892 discloses an apparatus for pumping pulp including motors 5 and 13 for driving screw 9 and impeller 3, respectively. Impeller 3 is driven at a higher revolution rate than screw 9. The capacity of screw 9 is adjusted to exceed the capacity of the pump of the apparatus so that recirculation of pulp between the screw thread and the axle is effected. The risk that the apparatus will clog is therefore reduced. However, if the apparatus disclosed by this patent were used to displace a very thick material, impeller 13 would still tend to clog, since a thick material would freely flow between the screw thread and the axle. Additionally, since pulp recirculates between the screw thread and the axle of the apparatus, this particular pump tends to be inefficient.

U.S. Pat. No. 4,594,006 discloses a mixing and pumping apparatus including a shaft 20 and pumping screw 22. As shaft 20 is rotated, crust at the surface of the slurry contained in reservoir R will be forced downwardly by screw 22 and mixed in with the rest of the slurry, thereby allowing the slurry to be pumped from reservoir R more quickly. The apparatus also includes agitator jet nozzles for further mixing the slurry.

By utilizing a pumping system in which the tendency of the system to clog is minimized, the need for mixing devices such as that illustrated by this patent may be eliminated.

SUMMARY OF THE INVENTION

The present invention accordingly provides for a booster pump assembly which is to be used in a system for pumping fluid of a variable consistency, such as manure, from a reservoir into a fluid container. The system includes means to withdraw fluid upwardly from the reservoir. Connecting means connects the means to withdraw fluid from the reservoir to a fluid inlet at one end of the booster pump assembly, the fluid being supplied to the fluid inlet by the connecting means. A fluid outlet is located at another end of the booster pump assembly. The fluid outlet is connected to a loading means so that the fluid is forced by the booster pump assembly through the fluid outlet and the loading means to the fluid container. A vacuum is created by the booster pump assembly in the connecting means so that the fluid is withdrawn easily from the receptacle by the means to withdraw fluid upwardly and the booster pump assembly. The specific construction of the booster pump assembly is also disclosed.

DETAILED DESCRIPTION OF THE PREFERRED EMBODIMENT

Figure 1:
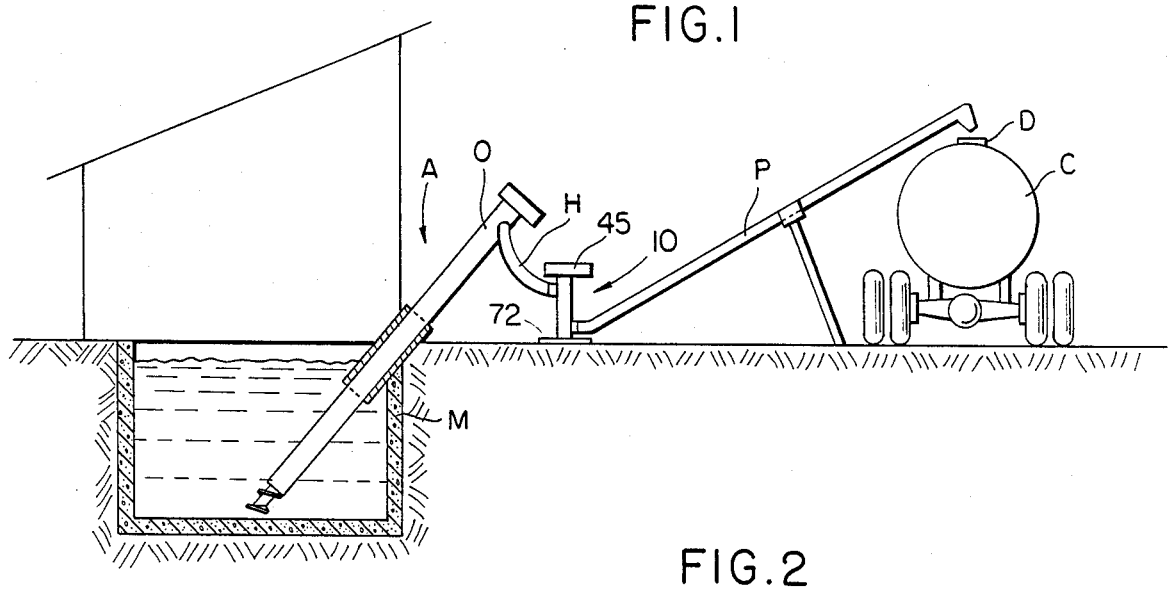
FIG. 1 illustrates an assembled system which is used for pumping a fluid of a variable consistency into a container.

FIG. 1 illustrates a complete system which is set up for pumping a fluid of a variable consistency. The system illustrated in FIG. 1 is used in the embodiment disclosed herein to pump manure from a manure filled pit or other reservoir M into the container C. It should be understood, however, that the system shown in FIG. 1 could be used to load any type of fluid which has a variable consistency into a container. The system includes a vacuum power assist auger A and a booster pump assembly 10 which creates a vacuum to withdraw manure upwardly from the pit M. From auger A, the manure withdrawn from pit M passes through a hose H to the booster pump assembly 10, which will be described in detail below. The manure is then ejected from a fluid outlet of the booster pump assembly 10 and is forced by the booster pump assembly through a loading pipe P to a top loading door D of a container C. Container C may be mounted on a wagon as illustrated so that it may be easily transported.

Figure 2:
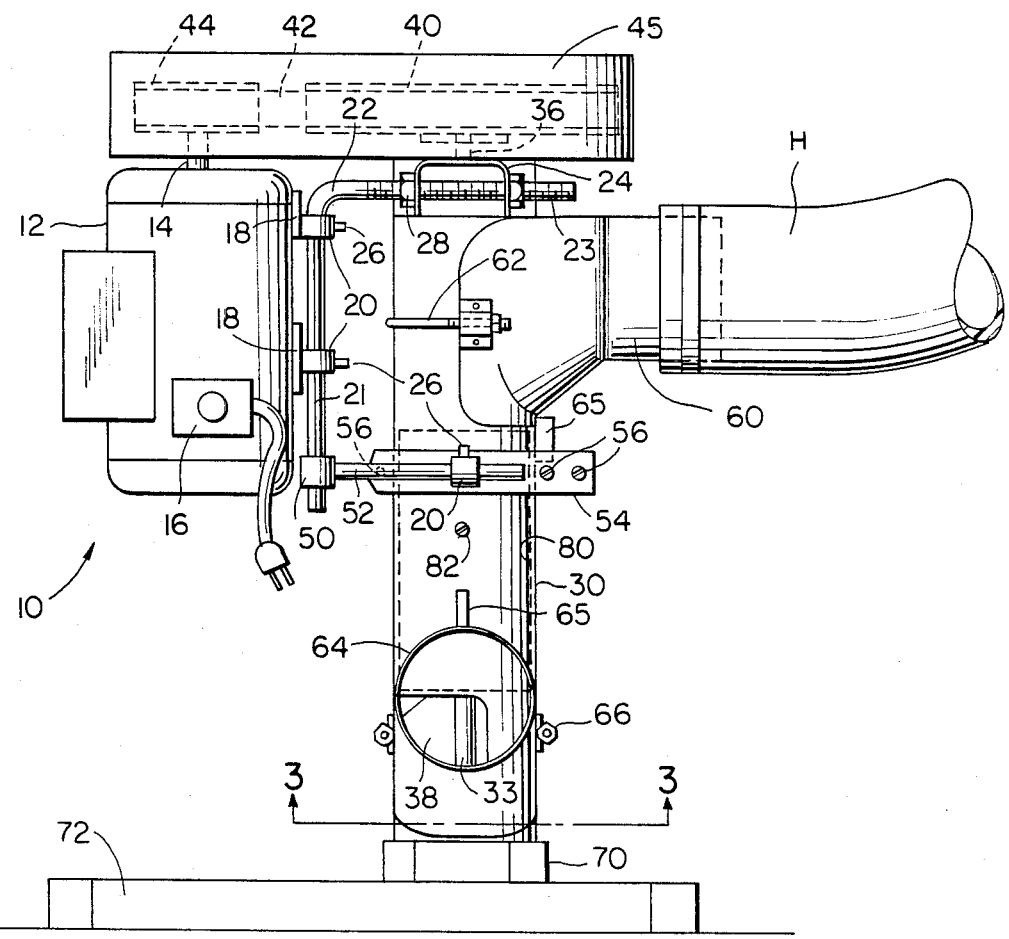
FIG. 2 is a detailed side view of the booster pump assembly schematically illustrated in FIG. 1.

FIG. 2 provides a detailed illustration of the booster pump assembly 10 of FIG. 1. The booster pump assembly 1 includes an electric motor (not shown) disposed within an electric motor casing 12 having an motor output shaft 14 extending therefrom and an on/off switch 16 for the electric motor. Electric motor casing 12 has plate portions 18 affixed to its exterior. Sleeves 20 are fixedly attached to plate portions 18. Plate portions 18 and the sleeves 20 may be cast or otherwise integrally formed with electric motor casing 12 if so desired.

Electric motor casing 12 is connected to the remainder of the booster pump assembly by a pair of L-shaped rods 22, only one of which is visible in FIG. 2. One leg 21 of each L-shaped rod 22 is vertically oriented and passes through each of the previously mentioned sleeves 20. The other leg 23 of each L-shaped rod 22 is horizontally oriented and passes through holes formed in U-shaped bracket 24. Electric motor casing 12 is maintained in a fixed vertical position relative to the remainder of the booster pump assembly by set screws 26. The electric motor casing is also held in a fixed horizontal position relative to the remainder of the booster pump assembly. This is accomplished in part by nuts 28 received on the threaded exterior of leg 23 so as to engage sides of a bracket 24 as shown in FIG. 2. It should be understood that although only one L-shaped rod 22 is visible in FIG. 2, two identical L-shaped rods on opposite sides of casing 12 are used to connect the electric motor casing to the remainder of the booster pump assembly.

Bracket 24 is affixed to an upper end portion of a vertically oriented outer tube 30. Received within outer tube 30 is a rotatable auger 32, which is more clearly illustrated in FIGS. 3 and 4. In the embodiment illustrated, auger 32 is approximately 6 inches in diameter and 30 inches long. Auger 32 includes central tube 33, screw 34, an upper end portion 36, a lower end portion 37, ejector paddles 38 and reinforcing plates 39, all preferably welded together. The upper end portion 36 of auger 32 has a first pulley 40 keyed thereto. A V-belt 42 passes around the pulley 40 and around a second pulley 44 which is keyed to motor output shaft 14. When the electric motor is switched on, pulley 44 is rotated by motor output shaft 14. Pulley 40 is therefore rotated by belt 42. Pulley 40 in turn causes auger 32 to rotate in a direction such that fluid moved by the booster pump assembly is forced downwardly within outer tube 30 by screw 34. Pulleys 40 and 44 are contained within a protective housing 45. Housing 45 is connected in any conventional manner to bracket 24.

Leg 21 of each L-shaped rod 22 is slidably received within yet another sleeve 50 disposed around its lower end. Sleeve 50 is welded or otherwise affixed to one end of each of a pair of horizontal rods 52. Each horizontal rod 52 passes through yet another sleeve 20 and is maintained in a fixed position relative to this sleeve 20 by a corresponding set screw 26. Each of these particular sleeves 20 is welded or otherwise affixed to one half of a C-shaped clamp 54. Both halves of the C-shaped clamp 54 are secured about the exterior of outer tube 30 by bolts 56. Electric motor casing 12 is therefore rigidly connected in an adjustable position relative to outer tube 30 by rods 22 and 52. Should it be necessary to vertically adjust the position of casing 12 relative to outer tube 30, it is necessary to loosen set screws 26 of the sleeves 20 through which leg 21 passes and to slide casing 12 along legs 21. Similarly, should it be necessary to horizontally adjust the position of casing 12 relative to outer tube 30 to adjust the tension of belt 42, for example, it is necessary to loosen set screws 26 of the sleeves 20 through which horizontal rods 52 pass and to loosen nuts 28 on the threaded exterior of leg 23. Casing 12 can then be moved horizontally relative to outer tube 30.

Outer tube 30 includes both a fluid inlet at an upper end thereof and a fluid outlet at a lower end thereof through which pumped fluid is respectively supplied and discharged. Ejector paddles 38 force fluid moved by booster pump assembly 10 out through the fluid outlet as auger 32 rotates. An inlet spout 60 is attached over the fluid inlet by a C-shaped clamp 62. An outlet spout 64 is similarly attached over the fluid outlet by a C-shaped clamp 66. Spouts 60 and 64 are approximately the same size and in the embodiment illustrated are roughly 6 inches in diameter. Both spouts 60 and 64 are mounted at 90° relative to outer tube 30 to make connection to the system illustrated in FIG. 1 easy. Ears 65 are affixed to the exterior of outer tube 30 to aid in locating spouts 60 and 64 respectively over the fluid inlet and fluid outlet.

Affixed to the lower end of outer tube 30 is a bearing casing 70. The lower end 37 of auger 32 is rotatably supported by bearings contained within bearing casing 70. Bearing casing 70 is bolted or welded to a supporting stand 72 for the booster pump assembly 10.

Figure 3:
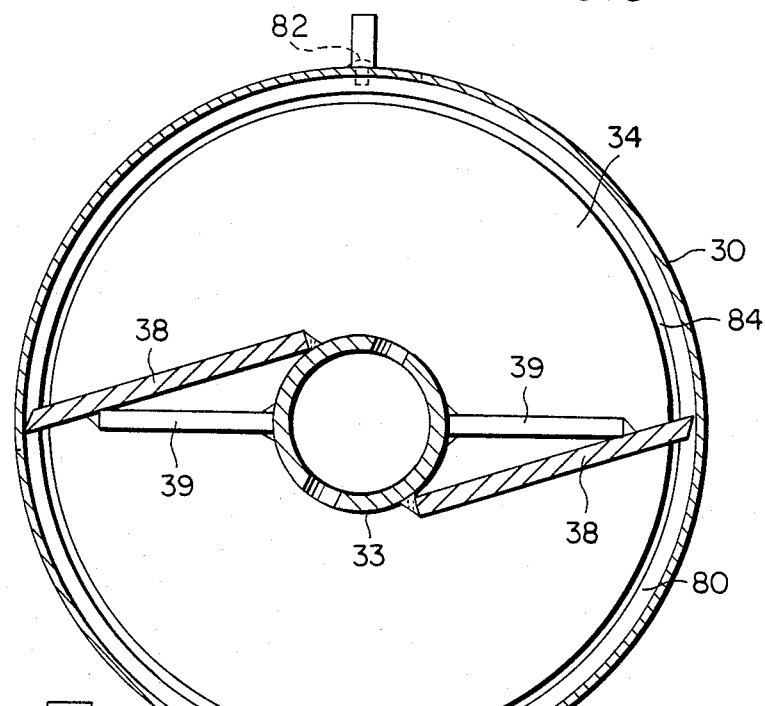
FIG. 3 is an cross-sectional view along section line 3—3 in FIG. 2 of the outer tube and rotatable auger of the booster pump assembly.
Figure 4:
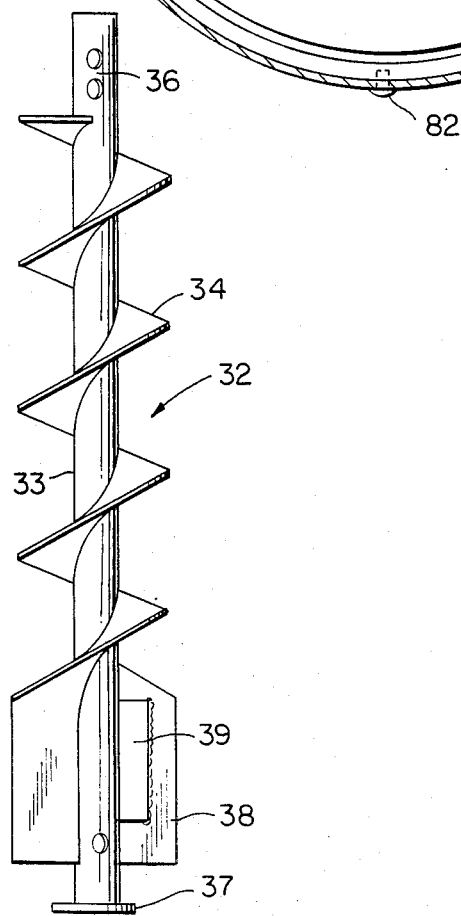
FIG. 4 is a side view of the rotatable auger of the booster pump assembly.

Outer tube 30 is lined on the inside with a cylindrical polyvinyl chloride (PVC) liner 80. PVC liner 80 is retained in position within outer tube 30 by a pair of rivits 82 which pass through liner 80 as shown in FIG. 3 and which are welded in place on diametrically opposite sides of outer tube 30. The liner 80 is provided only in the area between inlet spout 60 and outlet spout 64. In the embodiment illustrated, PVC liner 80 is approximately 12 inches long. As FIG. 3 illustrates, liner 80 acts to reduce clearance between auger screw 34 and outer tube 30 so that the open space 84 between the screw 34 and tube 30 is minimized. Thus, fluid passing through tube 30 can easily fill in the clearance between auger screw 32 and tube 30 to create a vacuum within nose H for reasons which will become apparent. Fluid moved by booster pump assembly 10 is unlikely to flow backwards upwardly through outer tube 30 while the booster pump assembly is in operation due to the effect of gravity on the fluid.

Referring again to FIG. 1, when the complete system is set up for loading, it consists of the vacuum power assist auger A, driven by an electric motor, pulley and V-belt driving means (not shown). The outlet end of a hollow outer casing O of the power assist auger A is connected to inlet spout 60 of booster pump assembly 10 by a hose H. In the embodiment illustrated, hose H is approximately 6 inches in diameter. Outlet spout 64 at the bottom of booster pump assembly 10 is connected to loading pipe P, which is preferably formed of PVC. In the embodiment illustrated, loading pipe P is approximately 6 inches in diameter, 20 feet in length and raises pumped fluid, in this instance manure, to a height of 7 to 8 feet to the top loading door D of the wagon mounted container C.

The system operates to load pumped fluid into container C in a manner to be described presently. Booster pump assembly 10 is started first by switching the on/-off switch 16 on. Power assist auger A is then started. Fluid is force fed from the manure filled pit M to the booster pump assembly 10 via outer casing O and hose H, thereby priming the booster pump assembly. Auger 32 of booster pump assembly 10 rotates at a speed which is slightly higher than the speed at which power assist auger A rotates. Since auger 32 rotates at a higher speed than that at which auger A rotates, a vacuum is created by the booster pump assembly 10 in hose H. Fluid is more easily moved by power assist auger A due to this vacuum in hose H, and as a result, the chances of power assist auger A becoming plugged are therefore reduced.

Once the fluid has been forced into booster pump assembly 10, gravity aids in passing the more solid portion of the fluid as well as the liquid portion thereof through said booster pump assembly by pulling the fluid downwardly within outer tube 30. The fluid acts to form a seal between screw 34 of auger 32 and the PVC liner 80. This seal aids in the creation of the vacuum in hose H mentioned above which in turn helps to withdraw the liquid portion of the manure from the pit. The rotation of auger 32 forces the fluid downwardly within tube 30 towards ejector paddles 38. The action of screw 34 and ejector paddles 38 keeps fluid moving through booster pump assembly 10 and through loading pipe P to top loading door D.

After container C has been filled, the system is stopped by first shutting power assist auger A off, and then shutting booster pump assembly 10 off. By using booster pump 10 in conjunction with power assist auger A, a fluid such as manure which varies in consistency from that of a liquid to that of thick, settled solids can be easily supplied to container C.

The foregoing is considered illustrative only of the principles of the invention. Since numerous modifications and changes will readily occur to those skilled in the art, it is not desired to limit the invention to the exact construction and operation shown and described. Accordingly, all suitable modifications and equivalents falling within the scope of the invention defined by the appended claims may be resorted to.

I claim:

1. A system for pumping a fluid into a fluid container comprising:
    means to withdraw fluid upwardly from a reservoir;
    a booster pump assembly comprising a vertically oriented outer tube; a rotatable auger received within said outer tube, said rotatable auger comprising an auger screw; means for rotating said rotatable auger in a direction such that fluid moved by said booster pump assembly is forced downwardly by said auger screw within said outer tube;
    connecting means connecting said means to withdraw fluid from said reservoir to a fluid inlet at one end of said booster pump assembly, said fluid being supplied to said inlet by said connecting means;
    a fluid outlet at another end of said booster pump assembly, said fluid outlet being connected to a loading means so that said fluid is forced by said booster pump assembly through said fluid outlet and said loading means to the fluid container;
    wherein fluid passing through said outer tube of said booster pump assembly easily fills in an open space between said auger screw and said outer tube and said booster pump assembly is continuously operated at a speed which is slightly higher than that at which the means to withdraw fluid upwardly from a reservoir is operated to create a vacuum in said connecting means so that said fluid is withdrawn easily from said reservoir by said means to withdraw fluid upwardly and said booster pump assembly.

2. A system for pumping a fluid into a container as recited in claim 1, wherein said fluid inlet is provided at an upper end of an outer tube of said booster pump assembly and said fluid outlet is provided at a lower end of said outer tube such that gravity aids in passing fluid through said booster pump assembly by pulling fluid downwardly within said outer tube.

3. A system for pumping a fluid into a fluid container as recited in claim 1, and further comprising a cylindrical liner lining the inside of said outer tube, said cylindrical liner minimizing open space between said auger screw and said outer tube.

4. A system for pumping a fluid into a container as recited in claim 3, wherein said means for rotating said rotatable auger comprises an electric motor, a first pulley, and a second pulley, said first pulley keyed to an upper end portion of said rotatable auger, said second pulley keyed to an output shaft of said electric motor, a belt passing around said first pulley and said second pulley such that as said second pulley is rotated by said output shaft, said belt rotates said first pulley which is turn causes said rotatable auger to rotate in said direction.

5. A system for pumping a fluid into a fluid container comprising:
    means to withdraw fluid upwardly from a reservoir;
    connecting means connecting said means to withdraw fluid from said reservoir to a fluid inlet at one end of a booster pump assembly, said fluid being supplied to said inlet by said connecting means;
    a fluid outlet at another end of said booster pump assembly, said fluid outlet being connected to a loading means so that said fluid is forced by said booster pump assembly through said fluid outlet and said loading means to the fluid container;
    wherein a vacuum is created by said booster pump assembly in said connecting means so that said fluid is withdrawn easily from said reservoir by said means to withdraw fluid upwardly and said booster pump assembly;
    said booster pump assembly further comprising a vertically oriented outer tube,
    a rotatable auger, comprising an auger screw, received within said outer tube;
    means for rotating said rotatable auger in a direction such that fluid moved by said booster pump assembly is forced downwardly by said auger screw within said outer tube;
    a cylindrical liner lining the inside of said outer tube and minimizing open space between said auger screw and said outer tube;
    said means for rotating said rotatable auger comprising an electric motor disposed within a casing, said casing connected to the remainder of the booster pump assembly by at least one L-shaped rod and at least one horizontal rod, each L-shaped rod including a vertically oriented leg passing through sleeves fixedly attached to said casing and a horizontally oriented leg passing through holes formed in a U-shaped bracket affixed to an upper end of said outer tube, said horizontally oriented leg including nuts received on a threaded exterior thereof, said nuts engaging sides of said U-shaped bracket;
    each horizontal rod including a sleeve affixed to one end thereof, said vertically oriented leg of said L-shaped rod slidably received within said sleeve affixed to said one end, each horizontal rod being affixed to a clamp secured about the exterior of said outer tube.

6. A system for pumping a fluid into a container as recited in claim 5, wherein said sleeves fixedly attached to said casing include set screws cooperating with said vertically oriented leg so that said casing is retained in an adjustable vertical position relative to said outer tube by said set screws.

7. A system for pumping a fluid into a container as recited in claim 6, wherein each horizontal rod passes through a sleeve fixedly attached to said clamp, each sleeve fixedly attached to said clamp including a set screw cooperating with the horizontal rod passing therethrough so that said casing is retained in an adjustable horizontal position relative to said outer tube by each said set screw cooperating with a horizontal rod and said nuts.

* * * * *